US008543792B1

(12) United States Patent
Glasco et al.

(10) Patent No.: US 8,543,792 B1
(45) Date of Patent: Sep. 24, 2013

(54) MEMORY ACCESS TECHNIQUES INCLUDING COALESING PAGE TABLE ENTRIES

(75) Inventors: David B. Glasco, Austin, TX (US); Lingfeng Yuan, Palo Alto, CA (US)

(73) Assignee: Nvidia Corporation, Santa Clara, CA (US)

( * ) Notice: Subject to any disclaimer, the term of this patent is extended or adjusted under 35 U.S.C. 154(b) by 566 days.

(21) Appl. No.: 11/523,950

(22) Filed: Sep. 19, 2006

(51) Int. Cl.
G06F 12/10 (2006.01)

(52) U.S. Cl.
USPC .......................................................... 711/207

(58) Field of Classification Search
USPC .................................................. 711/207, 205
See application file for complete search history.

(56) References Cited

U.S. PATENT DOCUMENTS

| | | | |
|---|---|---|---|
| 3,815,101 A | 6/1974 | Boss et al. |
| 3,950,729 A | 4/1976 | Fletcher et al. |
| 4,654,790 A | 3/1987 | Woffinden |
| 4,797,814 A | 1/1989 | Brenza |
| 4,812,981 A | 3/1989 | Chan et al. |
| 5,123,094 A | 6/1992 | MacDougall |
| 5,179,669 A | 1/1993 | Peters |
| 5,245,702 A | 9/1993 | McIntyre et al. |
| 5,278,962 A | 1/1994 | Masuda et al. |
| 5,414,824 A | 5/1995 | Grochowski |
| 5,446,854 A | 8/1995 | Khalidi et al. |
| 5,526,504 A | 6/1996 | Hsu et al. |
| 5,649,102 A | 7/1997 | Yamauchi et al. |
| 5,649,184 A | 7/1997 | Hayashi et al. |
| 5,696,925 A | 12/1997 | Koh |
| 5,949,785 A | 9/1999 | Beasley |
| 5,963,984 A | 10/1999 | Garibay, Jr. et al. |
| 5,999,189 A | 12/1999 | Kajiya et al. |
| 6,012,132 A | 1/2000 | Yamada et al. |
| 6,298,390 B1 | 10/2001 | Matena et al. |
| 6,362,826 B1 | 3/2002 | Doyle et al. |
| 6,457,115 B1 | 9/2002 | McGrath |
| 6,470,428 B1 | 10/2002 | Milway et al. |
| 6,499,090 B1 | 12/2002 | Hill et al. |
| 6,549,997 B2 | 4/2003 | Kalyanasundharam |
| 6,636,223 B1 | 10/2003 | Morein |
| 6,658,538 B2 | 12/2003 | Arimilli et al. |
| 6,742,104 B2 | 5/2004 | Chauvel et al. |
| 6,813,699 B1 | 11/2004 | Belgard |

(Continued)

FOREIGN PATENT DOCUMENTS

| | | |
|---|---|---|
| JP | 2288927 | 11/1990 |
| JP | 02288927 | 11/1990 |
| JP | 35054660 | 3/1991 |
| JP | 04182858 | 6/1992 |

OTHER PUBLICATIONS

Osronline, (the Basics: So what is a p. fault?) May 3, p. 1-2.
Final OA Dated Nov. 20, 2009; U.S. Appl. No. 11/591,685.

(Continued)

Primary Examiner — Duc Doan

(57) ABSTRACT

A memory access technique, in accordance with one embodiment of the present invention, includes coalescing mappings between virtual memory and physical memory when a contiguous plurality of virtual pages map to a contiguous plurality of physical pages. Any of the coalesced mappings are sufficient to map all pages within the coalesced region. Accordingly, a memory subsystem can cache a single coalesced mapping and not all of them. The single cached coalesced mapping may be used to translate all of the virtual addresses to physical addresses for the corresponding contiguous memory space.

17 Claims, 9 Drawing Sheets

(56) References Cited

U.S. PATENT DOCUMENTS

| | | | |
|---|---|---|---|
| 6,823,433 | B1 | 11/2004 | Barnes et al. |
| 6,839,813 | B2 | 1/2005 | Chauvel |
| 6,859,208 | B1 | 2/2005 | White |
| 6,877,077 | B2 | 4/2005 | McGee et al. |
| 6,883,079 | B1 | 4/2005 | Priborsky |
| 7,007,075 | B1 | 2/2006 | Coffey |
| 7,082,508 | B2 | 7/2006 | Khan et al. |
| 7,107,411 | B2 | 9/2006 | Burton et al. |
| 7,107,441 | B2 | 9/2006 | Zimmer et al. |
| 7,120,715 | B2 | 10/2006 | Chauvel et al. |
| 7,159,095 | B2 | 1/2007 | Dale et al. |
| 7,194,597 | B2 | 3/2007 | Willis et al. |
| 7,234,038 | B1 | 6/2007 | Durrant |
| 7,275,246 | B1 | 9/2007 | Yates, Jr. et al. |
| 7,401,358 | B1 | 7/2008 | Christie et al. |
| 7,447,869 | B2 | 11/2008 | Kruger et al. |
| 7,519,781 | B1 | 4/2009 | Wilt |
| 7,545,382 | B1 | 6/2009 | Montrym et al. |
| 2002/0004823 | A1 | 1/2002 | Anderson et al. |
| 2002/0013889 | A1 | 1/2002 | Schuster et al. |
| 2002/0169938 | A1 | 11/2002 | Scott et al. |
| 2002/0172199 | A1 | 11/2002 | Scott et al. |
| 2003/0014609 | A1 | 1/2003 | Kissell |
| 2003/0167420 | A1 | 9/2003 | Parsons |
| 2003/0196066 | A1 | 10/2003 | Mathews |
| 2003/0236771 | A1 | 12/2003 | Becker |
| 2004/0025161 | A1 | 2/2004 | Chauvel et al. |
| 2004/0054833 | A1 | 3/2004 | Seal et al. |
| 2004/0078778 | A1 | 4/2004 | Leymann et al. |
| 2004/0153350 | A1 | 8/2004 | Kim et al. |
| 2004/0193831 | A1 | 9/2004 | Moyer |
| 2004/0215918 | A1 | 10/2004 | Jacobs et al. |
| 2004/0268071 | A1 | 12/2004 | Khan et al. |
| 2005/0050013 | A1 | 3/2005 | Ferlitsch |
| 2005/0097280 | A1 | 5/2005 | Hofstee et al. |
| 2005/0268067 | A1 | 12/2005 | Lee et al. |
| 2006/0004984 | A1 | 1/2006 | Morris et al. |
| 2006/0069879 | A1 | 3/2006 | Inoue et al. |
| 2006/0069899 | A1 | 3/2006 | Schoinas et al. |
| 2006/0187945 | A1 | 8/2006 | Andersen |
| 2006/0195683 | A1 | 8/2006 | Kissell |
| 2006/0230223 | A1* | 10/2006 | Kruger et al. ............... 711/6 |
| 2006/0259732 | A1 | 11/2006 | Traut et al. |
| 2006/0259825 | A1 | 11/2006 | Cruickshank et al. |
| 2006/0282645 | A1 | 12/2006 | Tsien |
| 2006/0288174 | A1 | 12/2006 | Nace et al. |
| 2007/0067505 | A1 | 3/2007 | Kaniyur et al. |
| 2007/0073996 | A1 | 3/2007 | Kruger et al. |
| 2007/0106874 | A1 | 5/2007 | Pan et al. |
| 2007/0126756 | A1 | 6/2007 | Glasco et al. |
| 2007/0157001 | A1 | 7/2007 | Ritzau |
| 2007/0168634 | A1 | 7/2007 | Morishita et al. |
| 2007/0168643 | A1 | 7/2007 | Hummel et al. |
| 2008/0263284 | A1 | 10/2008 | da Silva et al. |

OTHER PUBLICATIONS

Non-Final OA Dated Apr. 27, 2009; U.S. Appl. No. 11/591,685.
Non-Final OA Dated Aug. 19, 2009; U.S. Appl. No. 11/592,076.
Non-Final OA Dated May 28, 2009; U.S. Appl. No. 11/523,830.
Non-Final OA Dated Sep. 15, 2008; U.S. Appl. No. 11/523,830.
Non-Final OA Dated Jan. 20, 2010; U.S. Appl. No. 11/586,756.
Final OA Dated Jun. 04, 2009; U.S. Appl. No. 11/586,756.
Non-Final OA Dated Nov. 18, 2008; U.S. Appl. No. 11/586,756.
Non-Final OA Dated Aug. 19, 2009; U.S. Appl. No. 11/591,857.
Final OA Dated Nov. 23, 2009; U.S. Appl. No. 11/591,857.
Non-Final OA Dated Apr. 1, 2009; U.S. Appl. No. 11/592,106.
Non-Final OA Dated Dec. 16, 2008; U.S. Appl. No. 11/586,826.
Non-Final OA Dated Feb. 17, 2009; U.S. Appl. No. 11/592,819.
Final OA Dated Nov. 9, 2009; U.S. Appl. No. 11/591,629.
Non-Final OA Dated Feb. 20, 2009; U.S. Appl. No. 11/591,629.
Final OA Dated Nov. 24, 2009; U.S. Appl. No. 11/592,780.
Non-Final OA Dated Apr. 2, 2009; U.S. Appl. No. 11/592,780.
Non-Final OA Dated Sep. 24, 2009; U.S. Appl. No. 11/588,177.
Final OA Dated May 21, 2009; U.S. Appl. No. 11/588,177.
Non-Final OA Dated Nov. 13, 2008; U.S. Appl. No. 11/588,177.
Final OA Dated Dec. 8, 2009; U.S. Appl. No. 11/591,856.
Non-Final OA Dated May 11, 2009; U.S. Appl. No. 11/591,856.
Final OA Dated Oct. 14, 2009; U.S. Appl. No. 11/586,825.
Non-Final OA Dated Mar. 18, 2009; U.S. Appl. No. 11/586,825.
Notice of Allowance; Mail Date Jan. 29, 2010; U.S. Appl. No. 11/592,076.
Restriction Requirement; Mail Date Apr. 28, 2009; U.S. Appl. No. 11/592,076.
Final Office Action; Mail Date Mar. 16, 2010; U.S. Appl. No. 11/523,830.
Restriction Requirement; Mail Date Apr. 27, 2009; U.S. Appl. No. 11/591,857.
Notice of Allowance; Mail Date Dec. 14, 2009; U.S. Appl. No. 11/586,826.
Notice of Allowance; Mail Date Jun. 22, 2009; U.S. Appl. No. 11/586,826.
Non Final Office Action; Mail Date Mar. 17, 2010; U.S. Appl. No. 11/592,819.
Notice of Allowance; Mail Date Oct. 16, 2009; U.S. Appl. No. 11/592,819.
Non Final Office Action; Mail Date Feb. 22, 2010; U.S. Appl. No. 11/586,825.
Laibinis, "Formal Development of Reactive Fault Tolerant Systems", Sep. 9, 2005, Springer, Second International Workshop, RISE 2005, p. 234-249.
Office Action dated May 11, 2010, U.S. Appl. No. 11/591,685.
Final Office Action dated Oct. 27, 2010, U.S. Appl. No. 11/591,685.
Restriction dated Apr. 28, 2009, U.S. Appl. No. 11/592,076.
Final Office Action dated Mar. 16, 2010, U.S. Appl. No. 11/523,830.
Notice of Allowance dated Jun. 28, 2010, U.S. Appl. No. 11/523,830.
Notice of Allowance dated Sep. 2, 2010, U.S. Appl. No. 11/523,830.
Notice of Allowance dated Jan. 20, 2011, U.S. Appl. No. 11/523,830.
Final Office Action dated Aug. 3, 2010, U.S. Appl. No. 11/586,756.
Notice of Allowance dated Dec. 27, 2010, U.S. Appl. No. 11/586,756.
Office Action dated Apr. 27, 2009, U.S. Appl. No. 11/591,857.
Office Action dated Dec. 7, 2010, U.S. Appl. No. 11/591,857.
Final Office Action dated Jun. 25, 2010, U.S. Appl. No. 11/592,106.
Office Action dated Dec. 16, 2010, U.S. Appl. No. 11/592,106.
Office Action dated Sep. 15, 2008, U.S. Appl. No. 11/523,926.
Final Office Action dated Apr. 10, 2009, U.S. Appl. No. 11/523,926.
Office Action dated Oct. 1, 2009, U.S. Appl. No. 11/523,926.
Notice of Allowance dated Mar. 29, 2010, U.S. Appl. No. 11/523,926.
Notice of Allowance dated Jul. 9, 2010, U.S. Appl. No. 11/523,926.
Notice of Allowance dated Oct. 27, 2010, U.S. Appl. No. 11/523,926.
Notice of Allowance dated Jun. 22, 2009, U.S. Appl. No. 11/586,826.
Notice of Allowance dated Dec. 14, 2009, U.S. Appl. No. 11/586,826.
Notice of Allowance dated Oct. 16, 2009, U.S. Appl. No. 11/592,819.
Office Action dated Mar. 17, 2010, U.S. Appl. No. 11/592,819.
Notice of Allowance dated Nov. 23, 2010, U.S. Appl. No. 11/592,819.
Office Action dated May 27, 2010, U.S. Appl. No. 11/591,629.
Office Action dated Nov. 3, 2010, U.S. Appl. No. 11/591,629.
Office Action dated Apr. 28, 2010, U.S. Appl. No. 11/592,780.
Office Action dated Oct. 13, 2010, U.S. Appl. No. 11/592,780.
Final Office Action dated Apr. 27, 2010, U.S. Appl. No. 11/255,177.
Office Action dated Apr. 27, 2010, U.S. Appl. No. 11/591,856.
Notice of Allowance dated Apr. 27, 2010, U.S. Appl. No. 11/591,856.
Office Action dated Feb. 22, 2010, U.S. Appl. No. 11/586,825.
Notice of Allowance dated Aug. 16, 2010, U.S. Appl. No. 11/586,825.
Notice of Allowance dated Nov. 26, 2010, U.S. Appl. No. 11/586,825.
Chaudhuri, "The impact of NACKs in shared memory scientific applications", Feb. 2004, IEEE, IEEE Transactions on Parallel and distributed systems vol. 15, No. 2, p. 134-150.
Laibinis, "Formal Development of Reactive Fault Tolerant Systems", Sep. 9, 2005, Springer, Second International Workshop, RISE 2005, pp. 234-249.
Wikipedia, Memory Address, Oct. 29, 2010, pp. 1-4, www.wikipedia.com.

Wikipedia, Physical Address, Apr. 17, 2010, pp. 1-2, www.wikipedia.com.
Non-Final Office Action, Mailed May 11, 2010; U.S. Appl. No. 11/591,685.
Final Office Action, Mailed Oct. 27, 2010; U.S. Appl. No. 11/591,685.
Restriction, Mailed Apr. 28, 2009; U.S. Appl. No. 11/592,076.
Notice of Allowance, Mailed Jan. 29, 2010; U.S. Appl. No. 11/592,076.
Notice of Allowance, Mailed May 4, 2010; U.S. Appl. No. 11/592,076.
Notice of Allowance, Mailed Aug. 13, 2010; U.S. Appl. No. 11/592,076.
Notice of Allowance, Mailed Nov. 26, 2010; U.S. Appl. No. 11/592,076.
Notice of Restriction, Mailed Aug. 10, 2010; U.S. Appl. No. 12/650,068.
Final Office Action, Mailed Mar. 16, 2010; U.S. Appl. No. 11/523,830.
Notice of Allowance, Mailed Jun. 28, 2010; U.S. Appl. No. 11/523,830.
Notice of Allowance, Mailed Sep. 2, 2010; U.S. Appl. No. 11/523,830.
Notice of Allowance, Mailed Jan. 20, 2011; U.S. Appl. No. 11/523,830.
Notice of Allowance, Mailed May 5, 2011; U.S. Appl. No. 11/523,830.
Final Office Action, Mailed Aug. 1, 2010; U.S. Appl. No. 11/586,756.
Notice of Allowance, Mailed Dec. 27, 2010; U.S. Appl. No. 11/586,756.
Notice of Allowance, Mailed May 12, 2011; U.S. Appl. No. 11/586,756.
Office Action, Mailed Apr. 27, 2009; U.S. Appl. No. 11/591,857.
Non-Final Office Action, Mailed Dec. 7, 2010; U.S. Appl. No. 11/591,857.
Notice of Allowance, Mailed Mar. 18, 2011; U.S. Appl. No. 11/591,857.
Final Office Action, Mailed Jun. 25, 2010; U.S. Appl. No. 11/592,106.
Non-Final Office Action, Mailed Dec. 16, 2010; U.S. Appl. No. 11/592,106.
Non-Final Office Action, Mailed Sep. 19, 2008; U.S. Appl. No. 11/523,926.
Final Office Action, Mailed Apr. 10, 2009; U.S. Appl. No. 11/523,926.
Non-Final Office Action, Mailed Oct. 1, 2009; U.S. Appl. No. 11/523,926.
Notice of Allowance; Mailed Mar. 29, 2010; U.S. Appl. No. 11/523,926.
Notice of Allowance; Mailed Jul. 9, 2010; U.S. Appl. No. 11/523,926.
Notice of Allowance; Mailed Oct. 27, 2010; U.S. Appl. No. 11/523,926.
Notice of Allowance, Mailed Jun. 22, 2009; U.S. Appl. No. 11/586,826.
Notice of Allowance, Mailed Dec. 14, 2009; U.S. Appl. No. 11/586,826.
Notice of Allowance; Mailed Oct. 16, 2009; U.S. Appl. No. 11/592,819.
Non-Final Office Action, Mailed Mar. 17, 2010; U.S. Appl. No. 11/592,819.
Notice of Allowance; Mailed Nov. 23, 2010; U.S. Appl. No. 11/592,819.
Non-Final Office Action, Mailed May 27, 2010; U.S. Appl. No. 11/591,629.
Non-Final Office Action, Mailed Nov. 3, 2010; U.S. Appl. No. 11/591,629.
Final Office Action, Mailed Jun. 8, 2011; U.S. Appl. No. 11/591,629.
Non-Final Office Action, Mailed Apr. 28, 2010; U.S. Appl. No. 11/592,780.
Non-Final Office Action, Mailed Oct. 13, 2010; U.S. Appl. No. 11/592,780.
Final Office Action, Mailed Apr. 27, 2010; U.S. Appl. No. 11/588,177.
Non-Final Office Action, Mailed Apr. 27, 2010; U.S. Appl. No. 11/591,856.
Notice of Allowance, Mailed Nov. 12, 2010; U.S. Appl. No. 11/591,856.
Notice of Allowance, Mailed Mar. 9, 2011; U.S. Appl. No. 11/591,856.
Non-Final Office Action, Mailed Feb. 22, 2010; U.S. Appl. No. 11/586,825.
Notice of Allowance, Mailed Aug. 16, 2010; U.S. Appl. No. 11/586,825.
Notice of Allowance, Mailed Nov. 26, 2010; U.S. Appl. No. 11/586,825.
Notice of Allowance, Mailed Mar. 4, 2011; U.S. Appl. No. 11/586,825.
Non-Final Office Action; Mail Date: May 6, 2011; U.S. Appl. No. 11/591,685.
Notice of Allowance; Mail Date: Mar. 17, 2011; U.S. Appl. No. 11/592,076.
Notice of Allowance; Mail Date: Jun. 29, 2011; U.S. Appl. No. 11/592,076.
Final Office Action; Mail Date: Feb. 1, 2011; U.S. Appl. No. 12/650,068.
Non-Final Office Action; Mail Date: Aug. 9, 2011; U.S. Appl. No. 12/650,068.
Notice of Allowance; Mail Date: Jul. 21, 2011; U.S. Appl. No. 11/523,830.
Notice of Allowance; Mail Date: Aug. 25, 2011; U.S. Appl. No. 11/523,926.
Final Office Action; Mail Date: May 4, 2010; U.S. Appl. No. 11/591,857.
Notice of Allowance; Mail Date: Jul. 21, 2011; U.S. Appl. No. 11/591,857.
Final Office Action; Mail Date: Jul. 5, 2011; U.S. Appl. No. 11/592;106.
Notice of Allowance; Mail Date: Feb. 16, 2011; U.S. Appl. No. 11/586,926.
Notice of Allowance; Mail Date: Jul. 26, 2011; U.S. Appl. No. 11/586,926.
Notice of Allowance; Mail Date: Apr. 19, 2011; U.S. Appl. No. 11/592,819.
Notice of Allowance; Mail Date: Sep. 7, 2011; U.S. Appl. No. 11/592,819.
Final Office Action; Mail Date: Apr. 12, 2011; U.S. Appl. No. 11/592,780.
Non-Final Office Action; Mail Date: Jun. 7, 2011; U.S. Appl. No. 11/588,177.
Notice of Allowance; Mail Date: Jun. 17, 2011; U.S. Appl. No. 11/591,856.
Notice of Allowance; Mail Date: Jun. 16, 2011; U.S. Appl. No. 11/586,825.
Notice of Allowance; Mail Date: Aug. 9, 2011; U.S. Appl. No. 11/586,825.
Notice of Allowance; Mail Date: Feb. 16, 2011; U.S. Appl. No. 11/523,926.
Notice of Allowance; Mail Date: May 23, 2011; U.S. Appl. No. 11/523,926.
Notice of Allowance; Mail Date: Aug. 23, 2011; U.S. Appl. No. 11/523,926.
Wikipedia, (CPU Cache definition), Wikipedia, Jan. 26, 2010, pp. 1-16.
Wikipedia, (Page Fault definition), Wikipedia, Mar. 9, 2009, pp. 1-4.
Final Office Action, Mailed Nov. 16, 2011; U.S. Appl. No. 11/591,685.
Notice of Allowance, Mailed Oct. 14, 2011; U.S. Appl. No. 11/592,076.
Non-Final Office Action, Mailed Nov. 16, 2011; U.S. Appl. No. 12/650,068.
Notice of Allowance, Mailed Jan. 13, 2012; U.S. Appl. No. 11/586,756.
Notice of Allowance, Mailed Oct. 28, 2011; U.S. Appl. No. 11/591,857.

Final Office Action, Mailed Dec. 2, 2011; U.S. Appl. No. 11/592,106.
Notice of Allowance, Mailed Oct. 28, 2011; U.S. Appl. No. 11/523,926.
Notice of Allowance, Mailed Oct. 26, 2011; U.S. Appl. No. 11/523,830.
Notice of Allowance, Mailed Dec. 27, 2011; U.S. Appl. No. 11/586,826.
Notice of Allowance, Mailed Dec. 9, 2011; U.S. Appl. No. 11/592,819.
Non-Final Office Action, Mailed Nov. 1, 2011; U.S. Appl. No. 11/592,780.
Final Office Action, Mailed Nov. 29, 2011; U.S. Appl. No. 11/588,177.
Notice of Allowance, Mailed Dec. 8, 2011; U.S. Appl. No. 11/586,825.
Guelfi et al., (Rapid Integration of Software Engineering Techniques) 2005, Second International Workshop, 9 pages.
Harper et al., (Rapid recovery from transient Faults in the fault tolerant processor with fault-tolerant shared memory) 1990, IEEE, pp. 350-359.
Ooi, (Fault Tolerant Architecture in a cache memory control LSI), 1992, IEEE, 507-514.
Final Office Action, Mailed Nov. 29, 2011; David B. Glasco, Austin, TX (US); U.S. Appl. No. 11/588,177; Publication No. N/A; Publication Date: N/A.
PCMAC (Definition of: Page fault) www.PCMag.com, 1 Page; Mar. 2009.
Shalan. (Dynamic Memory Management for embedded real-time multiprocessor system on a chip), 2000, ACM. 180-186.
Final Office Action, Mailed May 7, 2012; David B. Glasco, Austin, TX (US); U.S. Appl. No. 11/592,780; Publication No. N/A; Publication Date: N/A.
Final Office Action, Mailed Nov. 16, 2011; David B. Glasco, Austin, TX (US); U.S. Appl. No. 11/591,685; Publication No. N/A; Publication Date: N/A.
Notice of Allowance, Mailed Feb. 22, 2012; David B. Glasco, Austin, TX (US); U.S. Appl. No. 11/591,685; Publication No. N/A; Publication Date: N/A.
Notice of Allowance, Mailed May 30, 2012; David B. Glasco, Austin, TX (US); U.S. Appl. No. 11/591,685; Publication No. N/A; Publication Date: N/A.
Notice of Allowance, Mailed Oct. 14, 2011; David B. Glasco, Austin, TX (US); U.S. Appl. No. 11/592,076; Publication No. N/A; Publication Date: N/A.
Notice of Allowance, Mailed Jan. 27, 2012; David B. Glasco, Austin, TX (US); U.S. Appl. No. 11/592,076; Publication No. N/A; Publication Date: N/A.
Notice of Allowance, Mailed May 10, 2012; David B. Glasco, Austin, TX (US); U.S. Appl. No. 11/592,076; Publication No. N/A; Publication Date: N/A.
Non-Final Office Action, Mailed Nov. 16, 2011; David B. Glasco, Austin, TX (US); U.S. Appl. No.: 12/650,068; Publication No. US 2010-0106921 A1; Publication Date: Apr. 29, 2010.
Notice of Allowance, Mailed May 1, 2012; David B. Glasco, Austin, TX (US); U.S. Appl. No. 12/650,068; Publication No. US 2010-0106921 A1; Publication Date: Apr. 29, 2010.
Notice of Allowance, Mailed Jul. 6, 2012; David B. Glasco, Austin, TX (US); U.S. Appl. No. 12/650,068; Publication No. US 2010-0106921 A1; Publication Date: Apr. 29, 2010.
Notice of Allowance, Mailed Oct. 26, 2011; David B. Glasco, Austin, TX (US); U.S. Appl. No. 11/523,830; Publication No. N/A; Publication Date: N/A.
Notice of Allowance, Mailed Feb. 02, 2012; David B. Glasco, Austin, TX (US); U.S. Appl. No. 11/523,830; Publication No. N/A; Publication Date: N/A.
Notice of Allowance, Mailed May 10, 2012; David B. Glasco, Austin, TX (US); U.S. Appl. No. 11/523,830; Publication No. N/A; Publication Date: N/A.
Notice of Allowance, Mailed Jan. 13, 2012; David B. Glasco, Austin, TX (US); U.S. Appl. No. 11/586,756; Publication No. N/A; Publication Date: N/A.
Notice of Allowance, Mailed May 15, 2012; David B. Glasco, Austin, TX (US); U.S. Appl. No. 11/586,756; Publication No. N/A; Publication Date: N/A.
Notice of Allowance, Mailed Oct. 28, 2011; David B. Glasco, Austin, TX (US); U.S. Appl. No. 11/591,857; Publication No. N/A; Publication Date: N/A.
Notice of Allowance, Mailed Feb. 10, 2012; David B. Glasco, Austin, TX (US); U.S. Appl. No. 11/591,857; Publication No. N/A; Publication Date: N/A.
Notice of Allowance, Mailed May 25, 2012; David B. Glasco, Austin, TX (US); U.S. Appl. No. 11/591,857; Publication No. N/A; Publication Date: N/A.
Non-Final Office Action, Mailed Dec. 2, 2011; David B. Glasco, Austin, TX (US); U.S. Appl. No. 11/592,106; Publication No. N/A; Publication Date: N/A.
Final Office Action, Mailed May 10, 2012; David B. Glasco, Austin, TX (US); U.S. Appl. No. 11/592,106; Publication No. N/A; Publication Date: N/A.
Notice of Allowance, Mailed Oct. 28, 2011; David B. Glasco, Austin, TX (US); U.S. Appl. No. 11/593,926; Publication No. N/A; Publication Date: N/A.
Notice of Allowance, Mailed Feb. 24, 2012; David B. Glasco, Austin, TX (US); U.S. Appl. No. 11/523,926; Publication No. N/A; Publication Date: N/A.
Notice of Allowance, Mailed Jun. 1, 2012; David B. Glasco, Austin, TX (US); U.S. Appl. No. 11/523,926; Publication No. N/A; Publication Date: N/A.
Non-Final Office Action, Mailed Nov. 1, 2011; David B. Glasco, Austin, TX (US); U.S. Appl. No. 11/592,780; Publication No. N/A; Publication Date: N/A.
Notice of Allowance, Mailed Dec. 9, 2011; James M. Van Dyke, Austin, TX (US); U.S. Appl. No. 11/592,819; Publication No. N/A; Publication Date: N/A.
Notice of Allowance, Mailed Jun. 7, 2012; James M. Van Dyke, Austin, TX (US); U.S. Appl. No. 11/592,819; Publication No. N/A; Publication Date: N/A.
Notice of Allowance, Mailed Sep. 26, 2011; Lingfeng Yuan, Palo Alto, CA (US); U.S. Appl. No. 11/591,856; Publication No. N/A; Publication Date: N/A.
Notice of Allowance, Mailed Jan. 5, 2012; Lingfeng Yuan, Palo Alto, CA (US); U.S. Appl. No. 11/591,856; Publication No. N/A; Publication Date: N/A.
Notice of Allowance, Mailed Apr. 12, 2012; Lingfeng Yuan, Palo Alto, CA (US); U.S. Appl. No. 11/591,856; Publication No. N/A; Publication Date: N/A.
Notice of Allowance, Mailed Jun. 7, 2012; Lingfeng Yuan, Palo Alto, CA (US); U.S. Appl. No. 11/591,856; Publication No. N/A; Publication Date: N/A.
Notice of Allowance, Mailed Dec. 8, 2011; David B. Glasco, Austin, TX (US); U.S. Appl. No. 11/586,825; Publication No. US 2007-0126756 A1; Publication Date: Jun. 7, 2007.
Notice of Allowance, Mailed Mar. 21, 2012; David B. Glasco, Austin, TX (US); U.S. Appl. No. 11/586,825; Publication No. US 2007-0126756 A1; Publication Date: Jun. 7, 2007.
Notice of Allowance, Mailed Jul. 6, 2012; David B. Glasco, Austin, TX (US); U.S. Appl. No. 11/586,825; Publication No. US 2007-0126756 A1; Publication Date: Jun. 7, 2007.
Oracle, (Oracle 8i Parallel server), 1999, Oracle, Release 2 (8.1.6) 1-216.
Shalan. (Dynamic Memory Management for embedded real-time multiprocessor system on a chip), 2003, Georgia Inst. Of Tech. 1-118.
Notice of Allowance, Mailed Dec. 27, 2011; Lingfeng Yuan, Palo Alto, CA (US); U.S. Appl. No. 11/586,826; Publication No. N/A; Publication Date: N/A.
Notice of Allowance, Mailed Jul. 5, 2012; Lingfeng Yuan, Palo Alto, CA (US); U.S. Appl. No. 11/586,826; Publication No. N/A; Publication Date: N/A.
Glasco, et al. Notice of Allowance dated Sep. 26, 2012, U.S. Appl. No. 11/591,685; all pages.
Glasco, et al. Notice of Allowance dated Jan. 14, 2013, U.S. Appl. No. 11/591,685; all pages.
Glasco, et al. Notice of Allowance dated Aug. 16, 2012, U.S Appl. No. 111/592,076; all pages.

Glasco, et al. Notice of Allowance dated Sep. 17, 2012, U.S. Appl. No. 12/650,068; all pages.
Glasco, et al. Notice of Allowance dated Jan. 28, 2013, U.S Appl. No. 12/650,068; all pages.
Glasco, et al. Notice of Allowance dated Aug. 29, 2012, U.S Appl. No. 11/523,830; all pages.
Glasco, et al. Notice of Allowance dated Nov. 20, 2012, U.S Appl. No. 11/586,756; all pages.
Glasco, et al. Notice of Allowance dated Feb. 20, 2013, U.S. Appl. No. 11/586,756; all pages.
Glasco, et al. Notice of Allowance dated Oct. 28, 2011, U.S. Appl. No. 11/591,857; all pages.
Glasco, et al. Notice of Allowance dated Sep. 18, 2012, U.S. Appl. No. 11/591,857; all pages.
Glasco, et al. Notice of Allowance dated Dec. 31, 2013 U.S. Appl. No. 11/591,857; all pages.
Glasco, et al. Notice of Allowance dated Feb. 1, 2013, U.S. Appl. No. 11/591,857; all pages.
Glasco, et al. Office Action dated Jan. 3, 2013, U.S. Appl. No. 11/592,106; all pages.
Glasco, et al. Notice of Allowance dated Sep. 12, 2012, U.S. Appl. No. 11/523,926; all pages.
Yuan. Notice of Allowance dated Feb. 7, 2013, U.S. Appl. No. 11/586,826; all pages.
Van Dyke, et al. Notice of Allowance dated May 10, 2012, U.S. Appl. No. 11/592,819; all pages.
Van Dyke, et al. Notice of Allowance dated Jan. 24, 2013, U.S. Appl. No. 11/592,819; all pages.
Glasco, et al. Office Action dated Sep. 14, 2012, U.S. Appl. No. 11/591,629; all pages.
Glasco, et al. Notice of Allowance dated Mar. 7, 2013, U.S. Appl. No. 11/591,629; all pages.
Glasco, et al. Office Action dated Nov. 1, 2011, U.S. Appl. No. 11/592,780; all pages.
Glasco, et al. Final Office Action dated May 7, 2012, U.S. Appl. No. 11/592,780; all pages.
Glasco, et al. Notice of Allowance dated Sep. 14, 2012, U.S. Appl. No. 11/588,177; all pages.
Glasco, et al. Notice of Allowance dated Mar. 18, 2013, U.S. Appl. No. 11/588,177; all pages.
Yuan, Notice of Allowance dated Sep. 17, 2012, U.S. Appl. No. 11/591,856; all pages.
Yuan, Notice of Allowance dated Jan. 17, 2013, U.S. Appl. No. 11/591,856; all pages.
Glasco, et al. Notice of Allowance dated Oct. 12, 2012, U.S. Appl. No. 11/586,825;all pages.
Notice of Allowance dated May 8, 2013; U.S. Appl. No. 11/591,685, filed Nov. 1, 2006.
Notice of Allowance May 10, 2013; U.S. Appl. No. 11/591,857, filed Dec. 30, 2009.
Notice of Allowance Dated May 23, 2013; U.S. Appl. No. 11/591,857, filed Nov. 1, 2006.
Final Office Action Dated Jun. 6, 2013; U.S. Appl. No. 11/592,106, filed Nov. 1, 2006.
Notice of Allowance Dated May 8, 2013; U.S. Appl. No. 11/592,819, filed Nov. 2, 2006.
Notice of Allowance Dated Apr. 30, 2013; U.S. Appl. No. 11/591,856, filed Nov. 1, 2006.

* cited by examiner

MEMORY ACCESS TECHNIQUES INCLUDING COALESING PAGE TABLE ENTRIES

BACKGROUND OF THE INVENTION

Instructions and data used by a computing device are stored at physical addresses in one or more primary or secondary memory devices. Primary memory device, such as system memory, graphics memory and the like, is characterized by quick access times but stores a limited amount of data. Secondary memory devices, such as magnetic disk drives, optical disk drives and the like, can store large amounts of data, but have relatively longer access times as compared to the primary memory devices.

Generally, instructions and data are stored in pages in the one or more secondary memory devices. As pages are needed by a given application, they can be moved into one or more primary memory devices. Pages that are no longer needed by the application can be moved from the primary memory device back to the secondary memory device to make room for other pages that are needed by a given application. When pages are moved from secondary to primary memory or moved from primary memory back to secondary memory, their physical addresses change. However, it is undesirable and inefficient for applications running on a computing device to keep track of these changing physical addresses.

Accordingly, the applications utilize virtual addressing to access instructions and data. Virtual addressing provides a separation between the physical memory and the virtual addresses that an application utilized to load or store data and instructions. Processes running inside a virtual memory space do not have to move data between physical memory devices, and do not have to allocate or reallocate portion of the fixed amount of system level memory between them. Instead, a memory management unit (MMU) and/or the operating system (OS) keeps track of the physical location of each piece of data, and moves data between physical locations to improve performance and/or ensure reliability.

Referring to FIG. 1, an exemplary address translation data structure utilized to translate virtual addresses 110 to physical addresses 120 is illustrated. The address translation data structure may include a page table data structure 130 and a translation lookaside buffer (TLB) 140. The page table data structure 130 may include a page directory 150 and one or more page tables 160-190. The page directory 150 includes a plurality of page directory entries (PDE). Each PDE includes the address of a corresponding page table 160-190. Each PDE may also include one or more parameters. Each page table 160-190 includes one or more page table entries (PTE). Each PTE includes a corresponding physical address of data and/or instructions in primary or secondary memory. Each PTE may also include one or more parameters.

Upon receiving a virtual address, the TLB 140 is accessed to determine if a mapping between the virtual address 110 and the physical address 120 has been cached. If a valid mapping has been cached (e.g., TLB hit), the physical address 120 is output from the TLB 140. If a valid mapping is not cached in the TLB, the page table data structure is walked to translate the virtual address 110 to a physical address 120. More specifically, the virtual address 110 may include a page director index, a page table index, and a byte index. The page directory index in the virtual address 110 is used to index the page directory 150 to obtain the address of an appropriate page table 170. The page table index in the virtual address 110 is used to index the appropriate page table specified in the given PDE to obtain the physical address 120 of the page containing the data. The byte index in the virtual address 110 is then used to index the physical page to access the actual data. The resulting mapping is then typically cached in the TLB 140 for use in translating subsequent memory access requests. Furthermore, as a page moves from secondary memory to primary memory or from primary memory back to secondary memory, the corresponding PTE in the page table data structure 130 and TLB 140 is updated.

Generally, the PTE can also store additional attributes associated with memory accesses. An exemplary page table 140 that stores a plurality of PTEs is shown in FIG. 2. Each PTE in the page table 140 includes a page frame address 120 and one or more attributes 220. The attributes 220 may include a dirty bit, an accessed bit, a page check disable bit, page write transparent bit, a user accessible bit, a writeable bit, a present bit, a hash function identification bit, a valid bit, an address compare bit, a referenced bit, a changed bit, storage control bits, a no execute bit, page protection bits and/or the like. The attributes 220 can be used by the MMU and/or OS to manage the data in the primary and secondary memories and access thereto.

Referring now to FIG. 3, an exemplary memory subsystem according to the conventional art is shown. The memory subsystem includes a memory management unit 305 communicatively coupled to a computing device readable medium (e.g., primary memory), such as random access memory (RAM) 310. The memory 310 is adapted to store at least a portion of one or more address translation data structures 315, and data and instructions 320. In one implementation, the address translation data structure includes a page directory and one or more page tables 325 A given page table 325 may include a plurality (X) of PTEs.

The memory management unit 305 includes a paging module 320 and a cache 335. The paging module 330 is adapted to manage caching of page table entries 325' and translation of virtual address to physical addresses. In particular the paging module 330 caches one or more address translation mappings to service memory access requests. Each mapping includes a previously utilized page table entry and is stored as part of a translation lookaside buffer (TLB) 325'. Because the cache 335 in the memory management unit 305 is relatively small, the paging module 330 swaps mappings in an out of the cache 335 in accordance any conventional replacement algorithm. Accordingly, there are various tradeoffs between the size of the cache 335, latency resulting from having to swap page table entries between the cache 335 and memory 310, and communication traffic generated between the cache 335 and the memory 310.

SUMMARY OF THE INVENTION

Each page in a virtual memory space may be mapped to a page in a physical address space. Furthermore, there may be cases when a plurality of contiguous virtual pages are mapped to a plurality of contiguous physical pages. Accordingly, embodiments of the present invention are direct toward memory access techniques including coalesced mappings between contiguous pages. In one embodiment, a computing device includes memory and a memory management unit. The memory is adapted to store an address translation data structure used to translate virtual addresses to physical addresses. The memory management unit includes a cache and a paging module. The cache is adapted to store some or all of the mappings of the address translation data structure. The paging module is adapted to coalesce a plurality of mappings between contiguous virtual and physical memory. The paging module may further be adapted to load one of the plurality of coalesced mappings in the address translation data structure, instead of all of them, when loading some or all of the mappings into the cache. The paging module may further be adapted to use one of the coalesced mappings to translate any of the coalesced virtual address to the corresponding physical address.

In another embodiment, a technique for generating an address translation data structure includes determining if a plurality of contiguous pages in a virtual address space are mapped to a plurality of contiguous pages in a physical address space. If a given page is not contiguous, a mapping between the given virtual address and the corresponding physical address is generated and a contiguous attribute corresponding to the mapping is set to indicate that the page is not contiguous. If the page is contiguous with another page, a mapping for each contiguous virtual address and corresponding contiguous physical address is generated and the contiguous attribute corresponding to each such mapping is set to indicate that there are a plurality of contiguous pages.

In yet another embodiment, a method of accessing memory includes receiving a memory access request that includes a virtual address. Upon receipt of the request it is determined if there is a valid mapping between the virtual address and a physical address stored in a cache. If a valid mapping is not stored in the cache, it is determined if the virtual address in the request is greater than or equal to a virtual address in any other mapping in the cache, and less than the sum of the virtual address in a mapping and one less than a number of coalesced pages indicated in an attribute of the other mapping containing the virtual address. In such a case, the physical address may be calculated as a function of the physical address and the virtual address in the mapping and the virtual address in the request.

BRIEF DESCRIPTION OF THE DRAWINGS

Embodiments of the present invention are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 1:
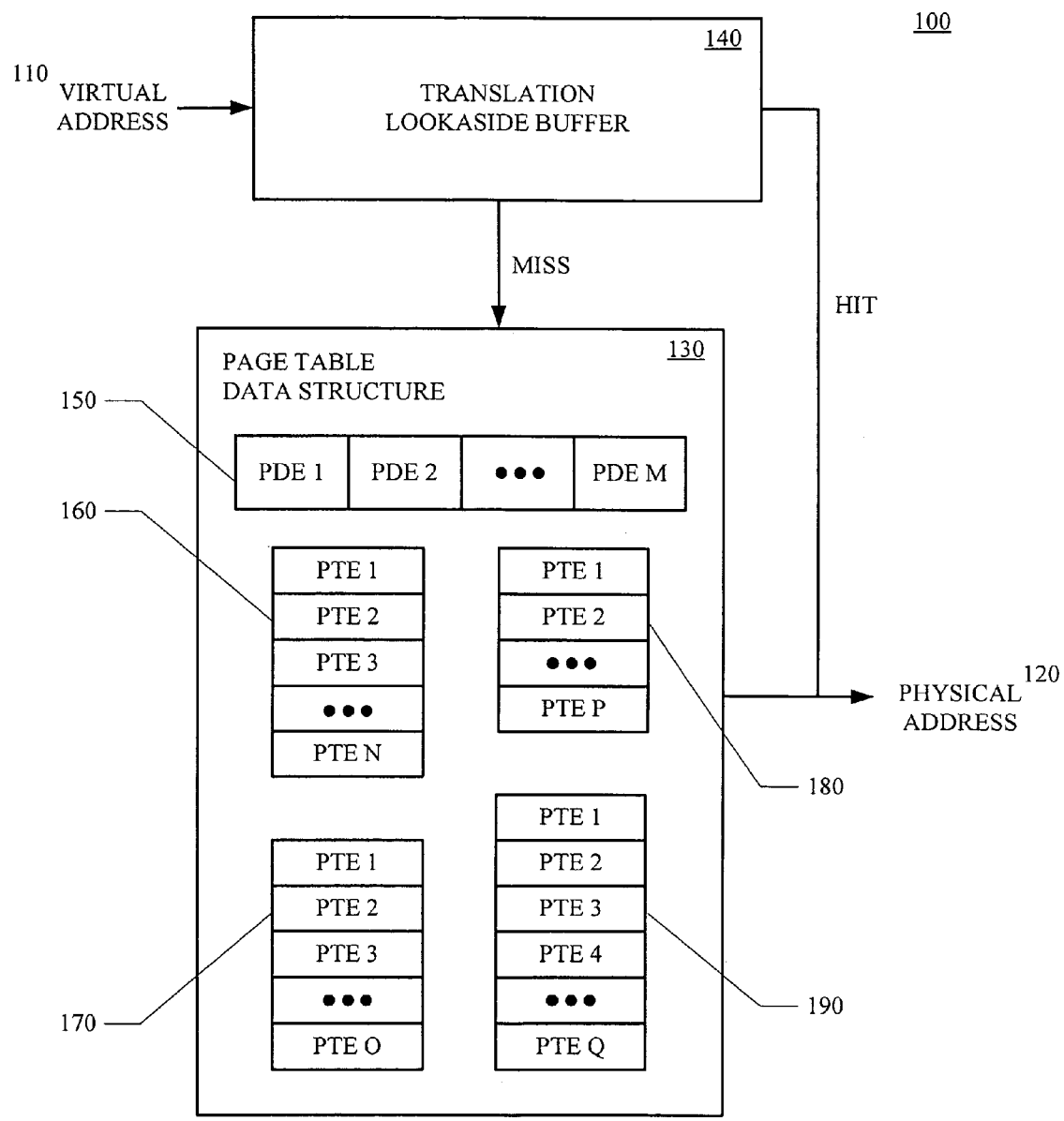
FIG. 1 shows a block diagram of an exemplary address translation data structure according to the conventional art.
Figure 2:
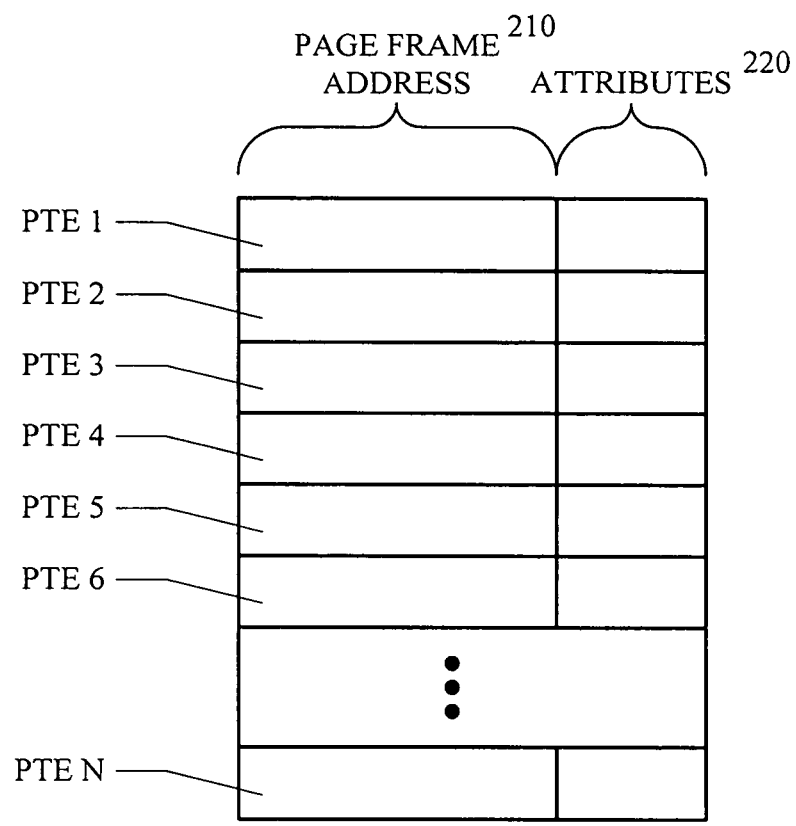
FIG. 2 shows a block diagram of an exemplary page table according to the conventional art.
Figure 3:
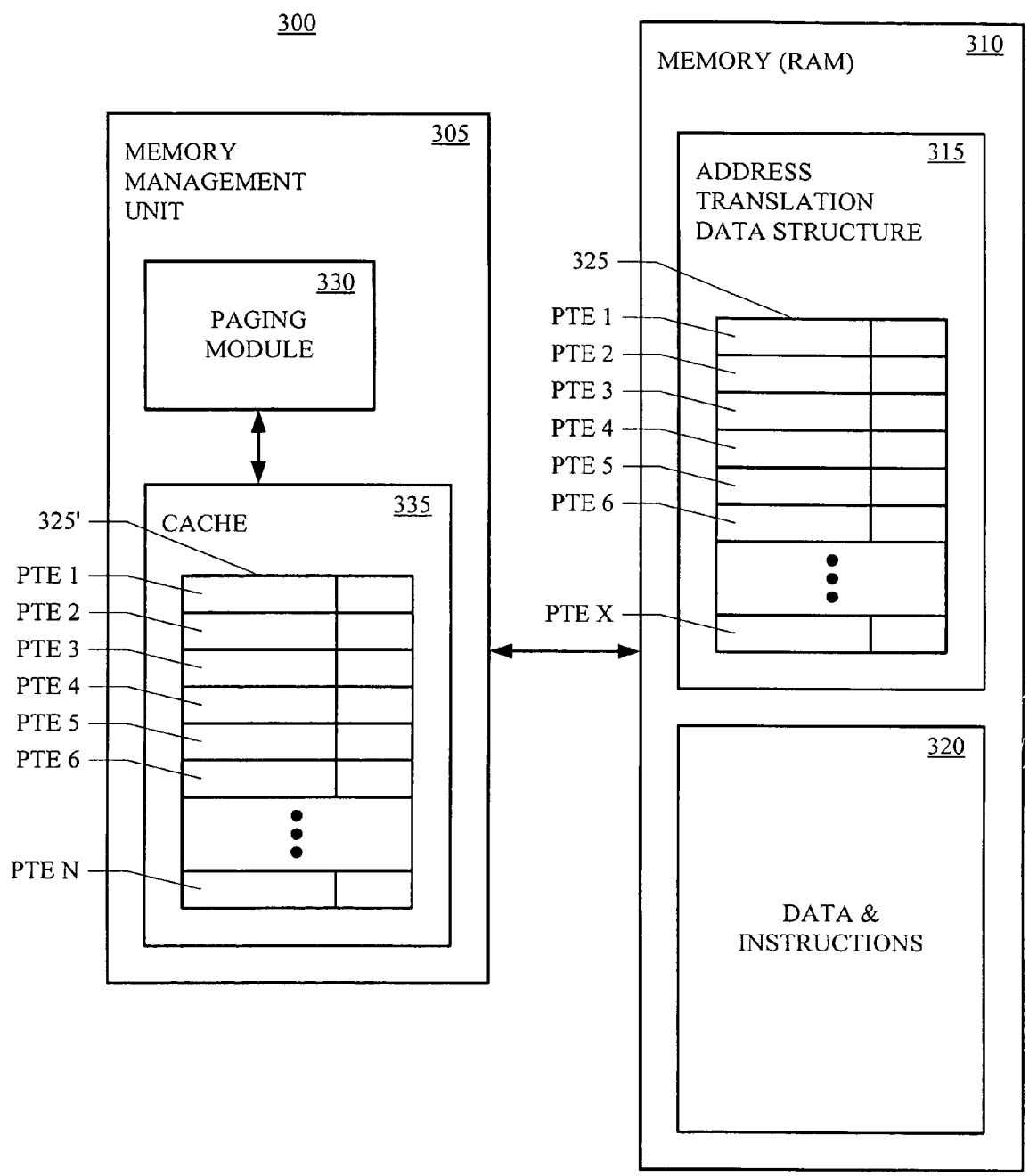
FIG. 3 shows a block diagram of an exemplary memory subsystem according to the conventional art.
Figure 4:
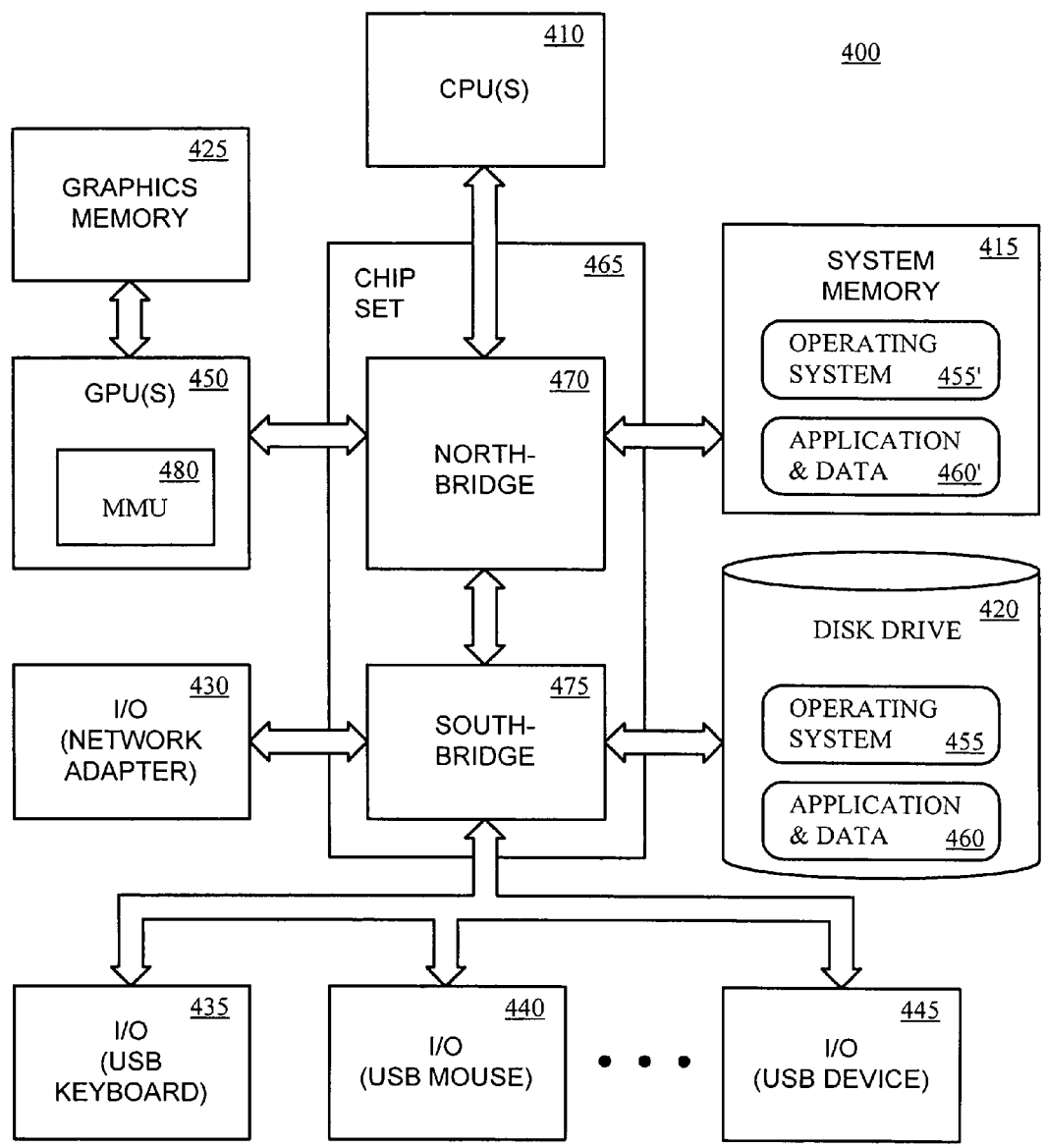
FIG. 4 shows a block diagram of an exemplary computing device for implementing embodiments of the present invention.

Referring to FIG. 4, an exemplary computing device 400 for implementing embodiments of the present invention is shown. The computing device 400 may be a personal computer, server computer, client computer, laptop computer, hand-held device, minicomputer, mainframe computer, distributed computer system or the like. The computing device 400 includes one or more processors (e.g., CPU) 410, one or more computing device-readable media 415, 420, 425 and one or more input/output (I/O) devices 420, 430, 435, 440, 445. The I/O device 430, 435, 440, 445 may include a network adapter (e.g., Ethernet card), CD drive, DVD drive and/or the like, and peripherals such as a keyboard, a pointing device, a speaker, a printer, and/or the like. The computing device 400 may also include one or more specialized processors, such as a graphics processing unit (GPU) 450.

The computing device-readable media 415, 420, 425 may be characterized as primary memory and secondary memory. Generally, the secondary memory, such as a magnetic and/or optical storage, provides for non-volatile storage of computer-readable instructions and data for use by the computing device 400. For instance, the disk drive 420 may store the operating system (OS) 455 and applications and data 460. The primary memory, such as the system memory 415 and/or graphics memory 425, provides for volatile storage of computer-readable instructions and data for use by the computing device 400. For instance, the system memory 415 may temporarily store a portion of the operating system 455' and a portion of one or more applications and associated data 460' that are currently used by the CPU 410, GPU 450 and the like.

The computing device-readable media 415, 420, 425, I/O devices 420, 430, 435, 440, 445, and GPU 450 may be communicatively coupled to the processor 410 by a chip set 465 and one or more busses. The chipset 465 acts as a simple input/output hub for communicating data and instructions between the processor 410 and the computing device-readable media 415, 420, 425, I/O devices 420, 430, 435, 440, 445, and GPU 450. In one implementation, the chipset 465 includes a northbridge 470 and southbridge 475. The northbridge 470 provides for communication with the processor 410 and interaction with the system memory 415. The southbridge 475 provides for input/output function.

The graphics processing unit 450 may include a memory management unit (MMU) 480 for managing the transfer of data and instructions. However, in other embodiments the MMU 480 may be independent circuit, a part of the chip set 465, a part of the primary or secondary memory, or other component in the computing device.

The MMU 480 translates virtual address to physical addresses. In one implementation, the virtual address space is divided into pages of size $2^N$ bytes. The pages may be from 2 kilobytes to 512 megabytes or more, and are typically 4 kilobytes to 64 kilobytes in size. In such cases, the MMU 480 translates virtual page numbers to physical page numbers utilizing an address translation data structure.

The MMU 460 and/or OS 455 also creates and manages the address translation data structure. In addition to the conventional management, the MMU 460 and/or OS 455 also may coalesce mappings between virtual memory and physical memory that are stored in the address translation data structure, when a contiguous plurality of virtual pages map to a contiguous plurality of physical pages. The MMU 460 may then use any of the coalesced mappings to translate virtual address to physical addresses for the corresponding contiguous memory spaces.

Figure 5:
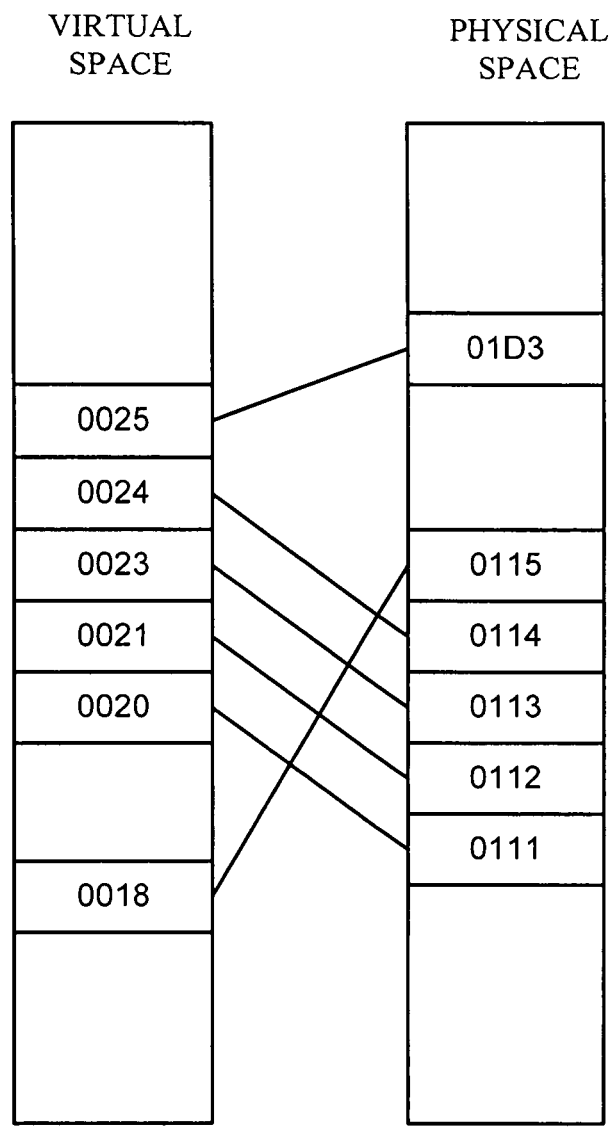
FIG. 5 shows a block diagram illustrating a mapping between a virtual address space and a physical address space.

Referring now to FIG. 5, an illustration of a mapping between a virtual address space and a physical address space, is shown. As depicted, each page in the virtual memory space may be mapped to a page in the physical address space. There may be cases during operation of the computing device 400 when a plurality of contiguous virtual pages are mapped to a plurality of contiguous physical pages. If a plurality of contiguous virtual pages are mapped to a plurality of contiguous physical pages, entries in an address translation data structure (e.g., page table data structure and/or TLB) may be coalesced.

Figure 6:
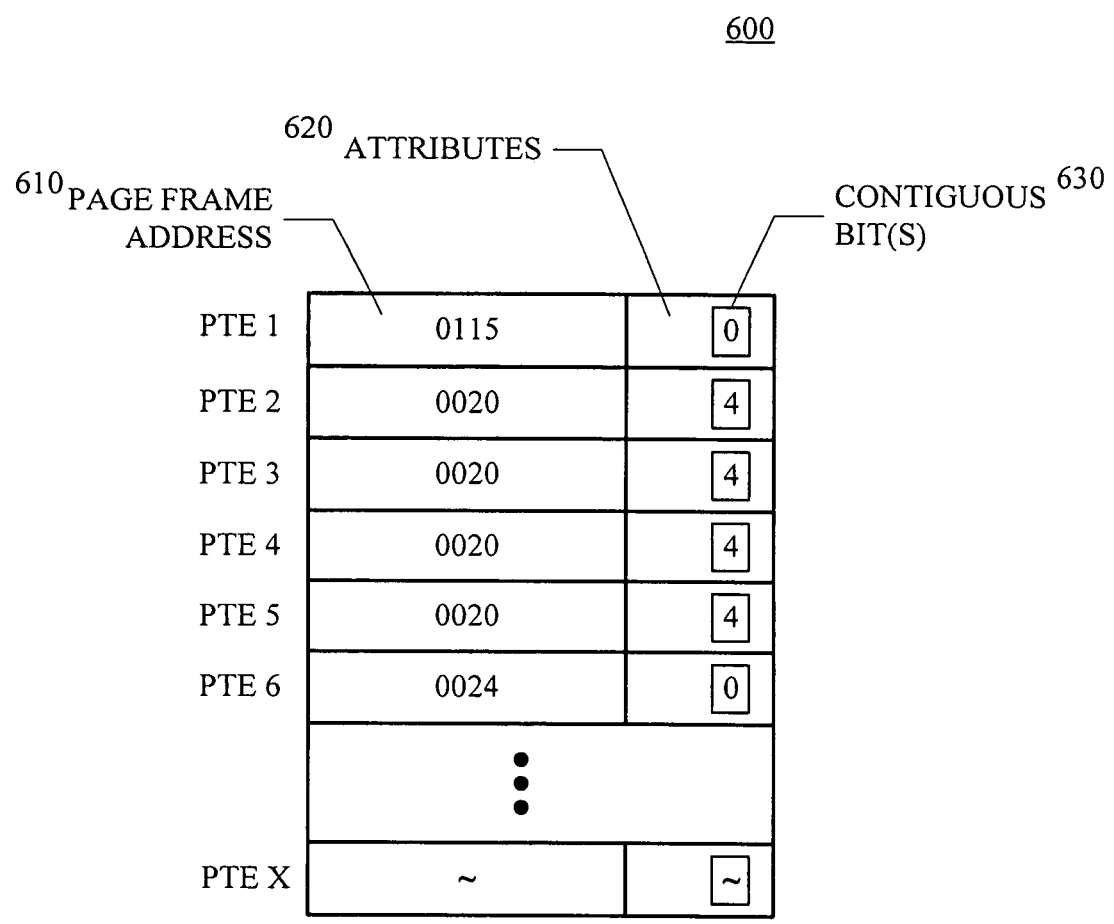
FIG. 6 shows a block diagram of an exemplary page table, in accordance with one embodiment of the present invention.

Referring now to FIG. 6, an exemplary page table, in accordance with one embodiment of the present invention, is shown. Each PTE in the page table 600 includes a page frame address 610 and one or more attributes 620. The attributes 620 may include one or more contiguous bits 630, a dirty bit, an accessed bit, a page check disable bit, page write transparent bit, a user accessible bit, a writeable bit, a present bit, a hash function identification bit, a valid bit, an address compare bit, a referenced bit, a changed bit, storage control bits, a no execute bit, page protection bits and/or the like. If a plurality of contiguous virtual pages are mapped to a plurality of contiguous physical pages, the frame address 610 of each corresponding PTE (e.g., PTE 2, PTE 3, PTE 4, PTE 5) may be the physical page number of the base physical page number (e.g., lowest address—0020) and the contiguous bits 630 are set to the number of contiguous pages (e.g., 4).

In one implementation, the contiguous bits directly specify the number of contiguous pages. For example, if there are three bits for specifying the number of contiguous pages and the bits are set to a value of "2," then the contiguous bits indicate that there are two contiguous virtual pages mapped to two contiguous physical pages. In another implementation, the contiguous bits specify a power-of-two number of pages. For example, if there are three bits for specifying the number of contiguous pages and the bits are set to a value of "2," then the contiguous bits indicate that there are four (e.g., $2^2$) contiguous virtual pages mapped to four contiguous physical pages. In another implementation, the contiguous bits include a first bit that indicates whether the remaining contiguous bits directly specify the number of contiguous pages or if the contiguous bits specify a power-of-two number of pages.

Figure 7:
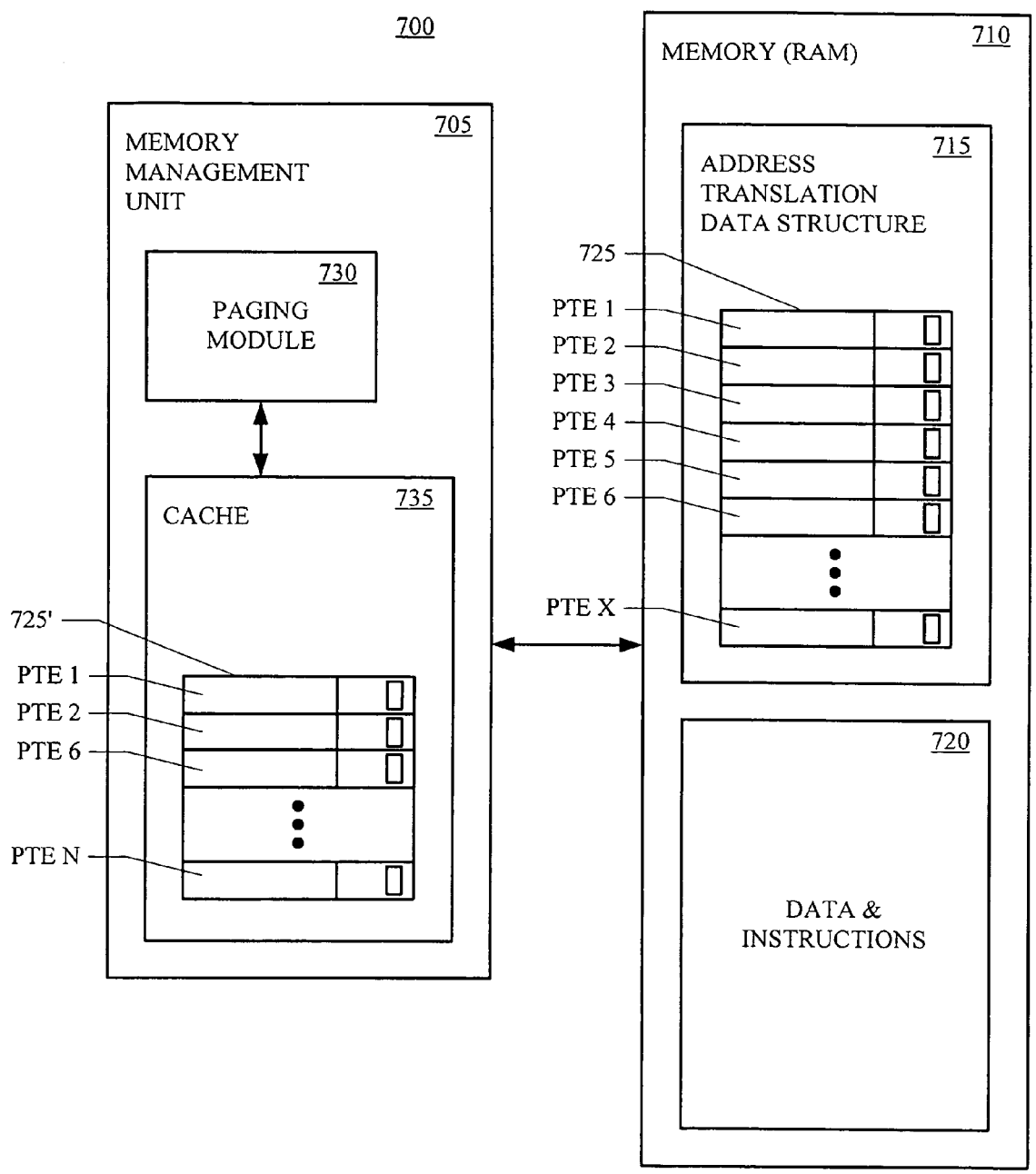
FIG. 7 shows a block diagram of a memory access subsystem, in accordance with one embodiment of the present invention.

Referring now to FIG. 7, a memory access subsystem, in accordance with one embodiment of the present invention, is shown. The memory subsystem 700 includes a memory management unit (MMU) 705 communicatively coupled to a computing device readable medium (e.g., primary memory), such as random access memory (RAM) 710. In one implementation, the computing device-readable medium 710 may be system memory 415. In another implementation, the computing device-readable medium 710 may be graphics memory 425. The memory 710 is adapted to store at least a portion of one or more address translation data structures 715, and data and instructions 720. A given page table 725 of the address translation data structure 715 stored in the memory 710 may include a plurality of PTEs.

In one implementation, the MMU 705 may be an integral part of a graphics processor 450 or chip set 465. In other implementations, the MMU 705 may be an independent circuit, a part of the primary or secondary memory, or the like. The memory management unit 705 includes a paging module 730 and a cache 735. The paging module 730 is adapted to manage the caching of address translation mappings and translation of virtual address to physical addresses. In particular the paging module 730 caches one or more address translation mappings to service memory access requests. Each mapping includes a previously utilized page table entry and is stored in a translation lookaside buffer (TLB) 725'. If the page table 725 and/or TLB 725' includes coalesced PTEs, any PTE within the coalesced region will be sufficient to map all pages within the coalesced region. Accordingly, the paging module 730 loads one of the coalesced PTEs and not all of them into the TLB 725' in the cache 735. In one implementation, the paging module 730 loads the PTE for the base physical page number.

When translating the virtual address to a physical address, the paging module 730 determines whether the virtual address of the request matches an entry in the TLB or page table data structure, or the virtual address of the request falls into the virtual address region covered by a coalesced TLB or page table entry. If the virtual address of the request has valid coalesced or non-coalesced entry, the physical address can be generated from the given entry.

Figure 8:
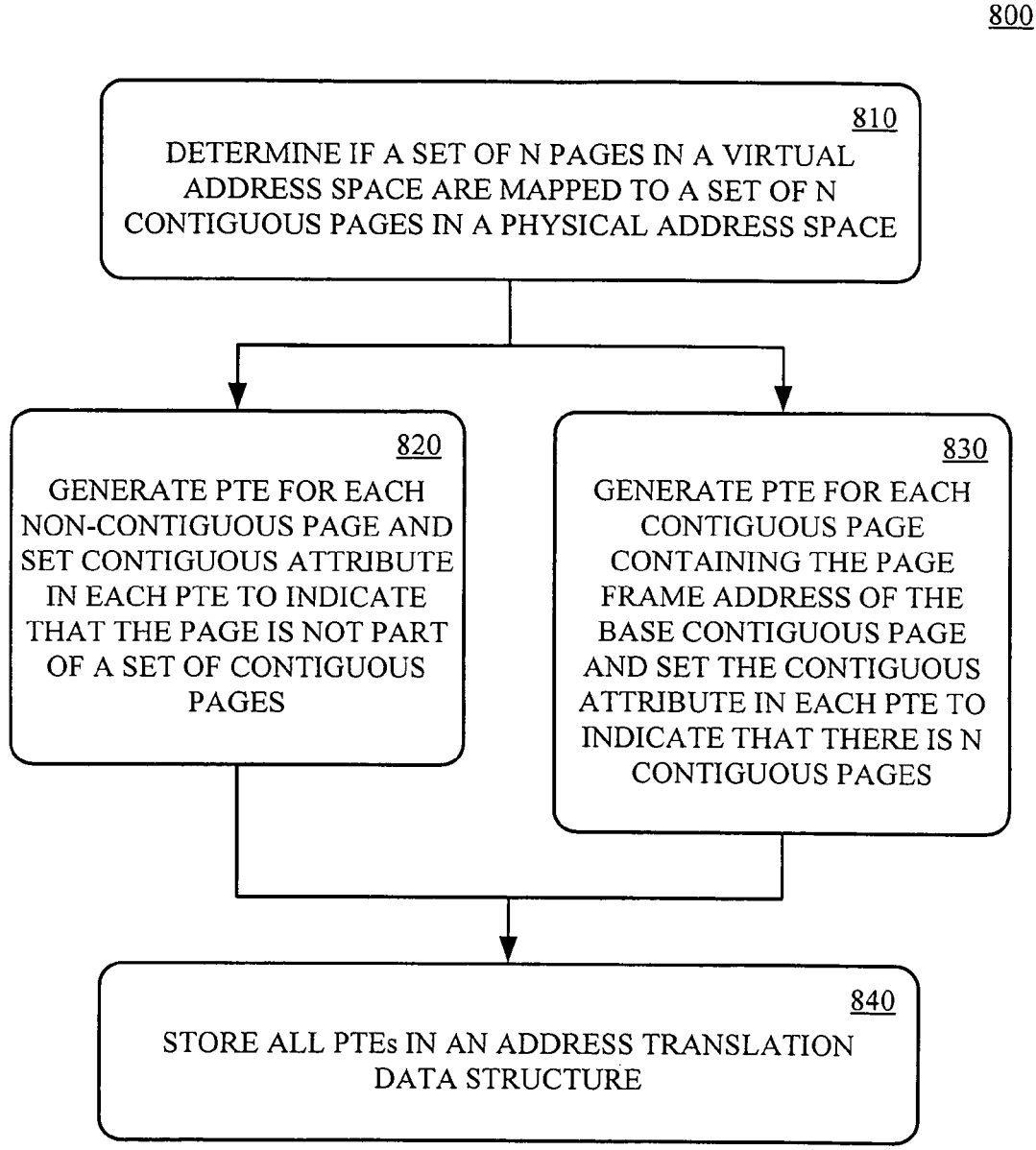
FIG. 8 shows a flow diagram of a method of generating a page table, in accordance with one embodiment of the present invention.

Referring now to FIG. 8, a method of generating an address translation data structure, in accordance with one embodiment of the present invention, is shown. The method 800 includes determining if a set of N contiguous pages in a virtual address space are mapped to a set of N contiguous pages in a physical address space, at 810. Pages that satisfy the condition that both the N virtual pages are contiguous and the N physical page are contiguous are simply referred herein to as contiguous pages. At 820, a PTE is generated for each non-contiguous page and the contiguous attribute in the PTE is set accordingly. At 830, a PTE is generated for each of the N contiguous page and the contiguous attribute in each PTE is set to indicate that there are N contiguous pages. At 840, the generated PTEs are stored in an address translation data structure. In one implementation, the PTE are stored in a page table and or a translation lookaside buffer (TLB). Furthermore, in one implementation, the PTE are generated by the OS 455 of the computing device 400.

Figure 9:
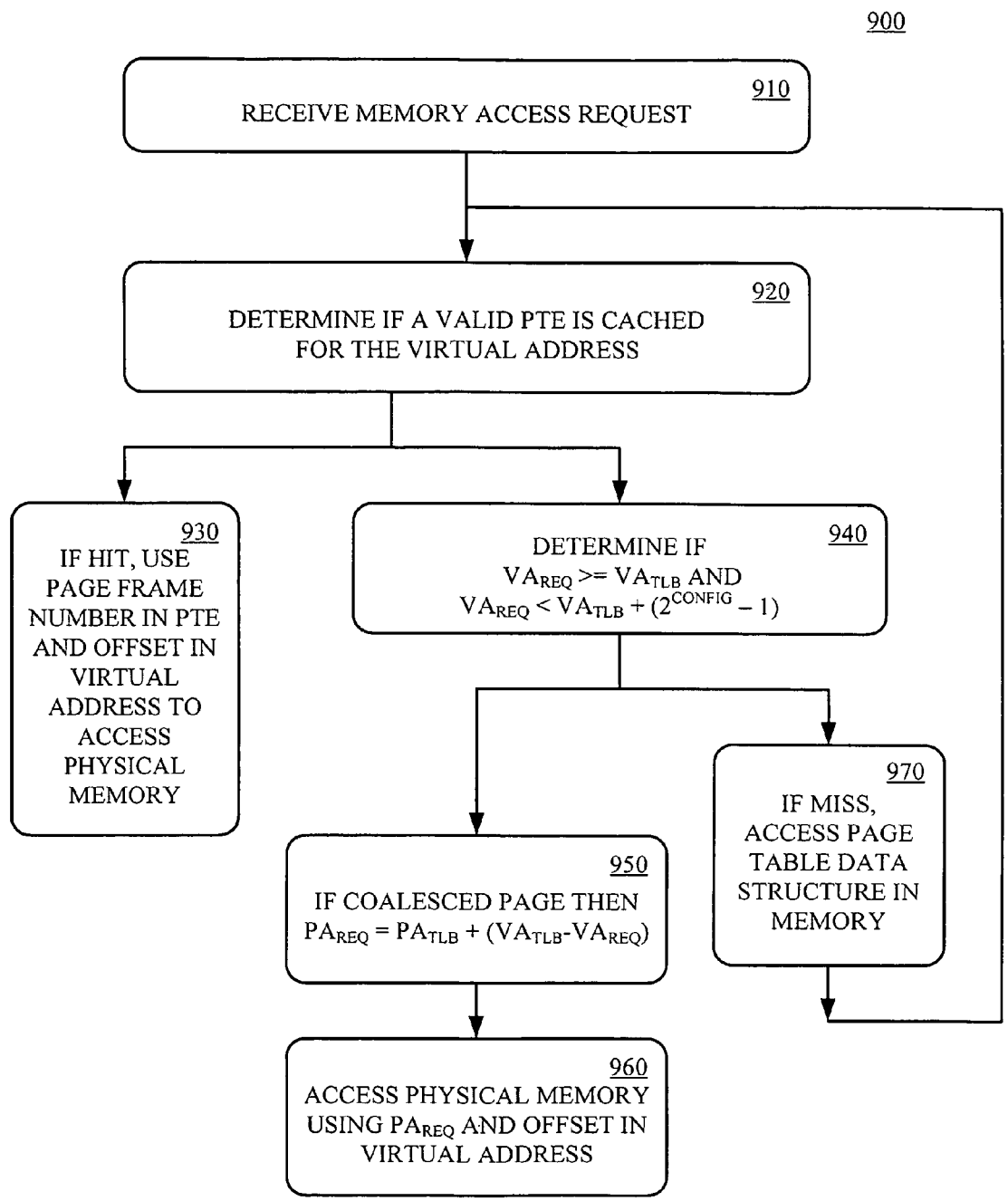
FIG. 9 shows a flow diagram of a method of translating a virtual address to a physical address, in accordance with one embodiment of the present invention.

Referring now to FIG. 9, a method of translating a virtual address to a physical address, in accordance with one embodiment of the present invention, is shown. In one implementation, the following method of translating a virtual address to a physical address may be performed by the memory management unit 480 of the computing device 400. As depicted in FIG. 9, the method 900 includes receiving a memory access request at 910. At 920, it is determined if a valid PTE is cached in a translation lookaside buffer (TLB) for the virtual address contained in the memory access request. At 930, if there is a valid PTE cached for the virtual address (e.g., a hit) than the page frame number in the valid PTE and the byte offset contained in the virtual address are utilized to access the physical memory.

At 940, if the virtual address does not result in a TLB hit, it is determined if there is a valid contiguous PTE cached for the virtual address. In one implementation, the virtual address is 1) greater than a virtual address that maps to a given PTE in the cache and 2) less than the sum of that virtual address and one less than the number of contiguous pages as indicated by the contiguous attribute in the given PTE. In one implementation, the contiguous attribute directly specifies the number of contiguous pages. Accordingly, a hit for a contiguous PTE occurs if $VA_{REQ} >= VA_{TLB}$ and $VA_{REQ} < VA_{TLB}+(\text{CONFIG}-1)$. In another implementation, the contiguous attribute specifies a power-of-two number of contiguous pages. Accordingly, a hit for a contiguous PTE occurs if $VA_{REQ} >= VA_{TLB}$ and $VA_{REQ} < VA_{TLB}+(2^{CONFIG}-1)$.

At 950, if a hit for a contiguous PTE is determined then the physical address of the page mapped to the virtual address of the memory access request is calculated based upon a virtual address in the contiguous PTE, a base physical address in the contiguous PTE and the virtual address in the request. In one implementation. The physical address is the sum of the physical address from the given PTE and the difference of the virtual address contained in the given PTE and the virtual address contained in the memory access request (e.g., $PA_{REQ}=PA_{TLB}+(VA_{TLB}-VA_{REQ})$). At 960, the calculated physical address and the byte offset contained in the virtual address are utilized to access the physical memory.

At 970, if a miss for both a valid PTE and a contiguous PTE is determined, than an appropriate valid PTE or contiguous PTE is fetched from a page table data structure stored in a separate memory. The appropriate valid PTE or contiguous PTE stored in the separate memory maybe determined by utilizing the processes at 920 and 940. Likewise, the processes at 930, 950 and 960 may be utilized for the appropriate valid PTE or contiguous PTE found in separate memory. The appropriate valid PTE or contiguous PTE retrieved from the separate memory may then be cached in the TLB for reference in subsequent memory access request.

Accordingly, embodiments of the present invention advantageously reduce the number of PTEs cached to service memory access requests when there are a plurality of contiguous virtual pages mapped to a plurality of contiguous physical pages. The technique also may reduce the amount of communication traffic and access latency associated with page misses by utilizing the PTE of a coalesced page to map the other contiguous virtual pages to physical pages.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computing device comprising:
   a computing device-readable medium to store an address translation data structure; and
   a memory management unit, communicatively coupled to the computing device-readable medium, including:
      a cache to store one or more address mappings of the address translation data structure; and
      a paging module, communicatively coupled to the cache, to coalesce a plurality of address mappings stored in the address translation data structure between a virtual memory space and a physical memory space when a contiguous plurality of virtual pages map to a contiguous plurality of physical pages, wherein;
      a first bit of a contiguous attribute, associated with a coalesced mapping, specifies a type of encoding;
      a plurality of other bits of the contiguous attribute specifies an actual number of contiguous pages when the first bit is set to a first state; and
      the plurality of other bits of the contiguous attribute specifies a power of two representation of the number of contiguous pages when the first bit is set to a second state.

2. The computing device of claim 1, where the paging module loads one of a plurality of coalesced mappings when storing the address mappings in the cache.

3. The computing device of claim 1, wherein the paging module further uses the coalesced mapping to translate any virtual address in the contiguous plurality of virtual pages to a given physical address.

4. The computing device of claim 1, wherein the computing device-readable medium comprises system memory.

5. The computing device of claim 1, wherein the computing device-readable medium comprises graphics memory.

6. A method of generating an address translation data structure comprising:
   determining if a plurality of contiguous pages in a virtual address space are mapped to a plurality of contiguous pages in a physical address space;
   generating a mapping between a virtual address and a corresponding physical address for each non-contiguous page and setting a contiguous attribute in the mapping to indicate that the mapping is not part of a set of contiguous pages; and
   generating a mapping for each contiguous virtual address and a corresponding contiguous physical address containing a page frame address of a given contiguous page and setting the contiguous attribute in the mapping to indicate that there are a plurality of contiguous pages, wherein;
   a first bit of the contiguous attribute specifies a type of encoding;
   a plurality of other bits of the contiguous attribute specifies an actual number of contiguous pages when the first bit is set to a first state; and
   the plurality of other bits of the contiguous attribute specifies a power of two representation of the number of contiguous pages when the first bit is set to a second state.

7. The method according to claim 6, wherein the mapping comprises a page table entry.

8. The method according to claim 7, further comprising storing all of the generated page table entries in a page table.

9. The method according to claim 8, further comprising caching one or more of the page table entries in a translation lookaside buffer.

10. The method according to claim 6, wherein the contiguous attribute is set to a number of the plurality of contiguous pages.

11. The method according to claim 6, wherein the contiguous attribute directly specifies a number of contiguous pages.

12. The method according to claim 6, wherein the contiguous attribute specifies a power of two number of contiguous pages.

13. A method of accessing memory comprising:
   receiving a memory access request that includes a virtual address;
   determining if a valid non-coalesced mapping between the virtual address and a physical address is cached in a translation lookaside buffer;

determining if a valid coalesced mapping between the virtual address in the memory access request and a physical address is cached in a translation lookaside buffer, wherein;

a first bit of a contiguous attribute in the mapping specifies a type of encoding;

a plurality of other bits of the contiguous attribute specifies an actual number of contiguous pages when the first bit is set to a first state; and the plurality of other bits of the contiguous attribute specifies a power of two representation of the number of contiguous pages when the first bit is set to a second state; and calculating a physical address as a function of a physical address and a virtual address in the mapping and the virtual address in the memory access request if a valid coalesced mapping is cached.

14. The method according to claim 13, wherein each mapping between a given virtual address and a given physical address comprises a page table entry.

15. The method according to claim 13, further comprising accessing a computing device-readable medium at the calculated physical address when a valid coalesced mapping is stored in the translation lookaside buffer.

16. The method according to claim 13, further comprising accessing the computing device-readable medium at a physical address specified in the mapping when a valid non-coalesced mapping is stored in the translation lookaside buffer.

17. The method according to claim 13, further comprising
accessing a page table when a valid non-coalesced or coalesced mapping is not cached in a translation lookaside buffer.

* * * * *